Aug. 15, 1944.    T. C. WETHERBY    2,356,114
CONTROL SYSTEM
Filed Oct. 28, 1942
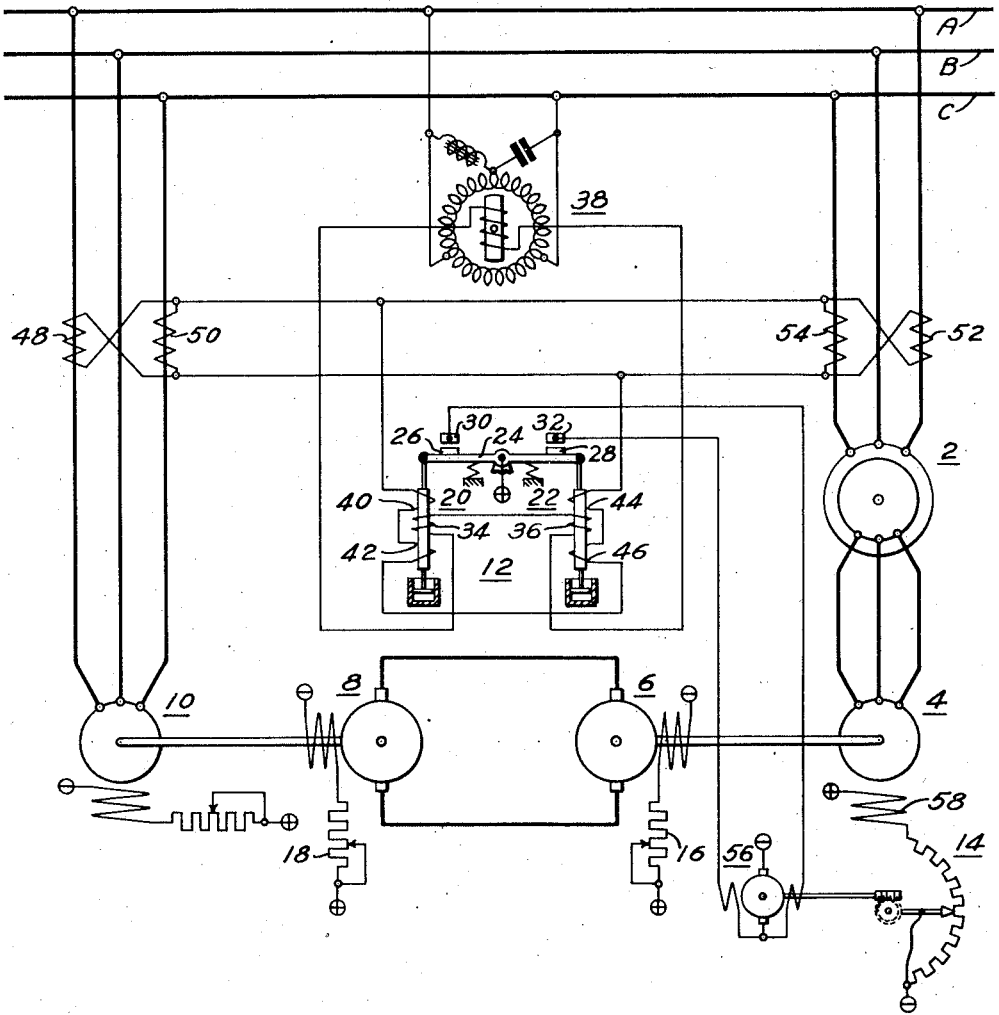
WITNESSES:
James F. Young
Joe Weber
INVENTOR
Tracy C. Wetherby.
BY
G. M. Crawford
ATTORNEY Patented Aug. 15, 1944

2,356,114

UNITED STATES PATENT OFFICE 2,356,114

CONTROL SYSTEM

Tracy C. Wetherby, Forest Hills, Pa., assignor to Westinghouse Electric & Manufacturing Company, East Pittsburgh, Pa., a corporation of Pennsylvania Application October 28, 1942, Serial No. 463,613

4 Claims. (Cl. 172—274)

The present invention relates, generally, to control systems, and, more particularly, to control systems for variable speed alternating-current motors.

It is common practice to vary the speed of a wound rotor induction motor by connecting one of its windings to an auxiliary variable speed alternating-current machine. The auxiliary machine in such a system may be connected with another alternating-current machine which is connected to the main source of alternating-current power. The power system thus has connected to it the main variable speed induction motor and the auxiliary alternating-current machine.

An object of the invention is to provide a control system for a variable speed alternating-current motor and its auxiliary control apparatus which shall function to automatically maintain a predetermined desired power factor for the system.

Another object of the invention is to provide a control system for a plurality of electric machines which shall function to so control the power factor of certain of the machines as to provide a desired power factor for the plurality of machines.

These and other objects and advantages of the invention will be apparent from the following detailed description taken in connection with the accompanying drawing the single figure of which is a diagrammatic representation of a control system for a variable speed motor embodying the principal features of the invention.

In practicing the invention, a wound rotor induction motor 2 has its stator windings connected to be energized from a source of power designated by the conductors A—B—C and has its rotor windings connected in circuit with an alternating-current machine 4. The alternating-current machine 4 may be a synchronous machine connected in driving relation with a dynamo-electric machine 6 whose armature is electrically connected to a second dynamo-electric machine 8. The machine 8 is connected in driving relation with an alternating-current machine 10 which may be a synchronous machine capable of being operated as either an alternator or a synchronous motor. The alternating-current winding of the machine 10 is connected to be energized by the power source A—B—C. A power factor responsive device 12 is connected to respond to the power factor of the power flow between the source of alternating-current power and the machines 2 and 10 and controls a variable resistor 14 which, in turn, controls the excitation of the machine 4. The excitations of the machines 6 and 8 may be varied as desired by variable resistors 16 and 18, respectively.

The power factor responsive device 12 comprises a pair of solenoids 20 and 22 which are connected to actuate a pivoted bar 24 in opposed relation. Contact elements 26 and 28 are disposed to be actuated by the bar 24 in cooperative relation with a pair of fixed contact elements 30 and 32. The solenoids 20 and 22 have potential windings 34 and 36, respectively, which are energized in series circuit relation from the power circuit conductors A and C through a suitable phase shifter 38. The solenoids 20 and 22 also comprise current windings 40 and 42 and 44 and 46, respectively, which are connected to be energized by current transformers 48 and 50, 52 and 54, and the current flowing in these current windings is, therefore, a measure of the vector sum of the load currents of the machines 2 and 10. The contact elements 26 and 30 and 28 and 32 of the power factor responsive device 12 are connected to energize and control the direction of rotation of a reversible motor 56 which is disposed to actuate the variable resistor 14.

The phase shifter 38 which is connected in the circuit of the potential windings 34 and 36 of the power factor responsive device 12 may be adjusted to provide any desired vector relation between the potential acting on the windings 34 and 36 and the vector sum of the load currents of the machines 2 and 10 to thus cause the power factor responsive device 12 to respond to any desired total power factor of the power flow between the source of alternating-current power A—B—C and the machines 2 and 10.

In the operation of the system, while the induction motor 2 is running, the machine 4 operates as a synchronous motor to drive the machine 6 as a direct-current generator. This, in turn, energizes the machine 8 as a direct-current motor which drives the machine 10 as an alternating-current generator to feed power to the source of power A—B—C. The speed of the induction motor 2 may be varied by the actuation of the variable resistors 16 and 18 to vary the excitations of the machines 6 and 8. The power factor of the power flowing into the induction motor 2 may be varied by varying the excitation of the machine 4.

When the power factor of the power flowing between the source of alternating-current power A—B—C and the machines 2 and 10 varies beyond a predetermined value for which the power factor responsive device 12 is set by the adjustment of the phase shifter 38, the power factor responsive device 12 will operate the motor 56 in such a direction as to cause the variable resistor 14 to vary the energization of the field winding 50 of the machine 4 to thereby vary the excitation of the machine 4 and the power factor of the power flowing between the source of alternating-current power A—B—C and the induction motor 2.

It is to be understood that any desired variable speed system for transferring power between the machines 4 and 10 may be employed and that the part of the system comprising the direct-current machines 6 and 8 is merely illustrative of one desirable system for transferring this power. It is also to be understood that any suitable power factor responsive device which will perform the functions outlined in the description of the power factor responsive device 12 shown herein may be employed in the control system. It is further to be understood that the stator and rotor windings of the induction motor 2 may be connected to the machine 4 and the source of power A—B—C respectively instead of as shown in the drawing.

Thus it will be seen that I have provided a control system for a plurality of electric machines which shall function to so control the power factor of certain of the machines as to provide a desired power factor for the plurality of machines.

In compliance with the requirements of the patent statutes, I have shown and described herein a preferred embodiment of my invention. It is to be understood, however, that the invention is not to be limited to the precise construction shown and described but is capable of modification by one skilled in the art, the embodiment herein shown being merely illustrative of the principles of the invention.

I claim as my invention:

1. In a control system for a wound rotor induction motor which has one set of its reacting windings connected to be energized from a source of alternating-current power, a first alternating-current machine connected to the other winding of the induction motor, electrical power transfer means including a second alternating-current machine connected to the power source and said first alternating-current machine, and automatic means for so controlling the excitation of the first alternating-current machine as to maintain a predetermined power factor of the total power flow in said second alternating-current machine and said induction motor, said automatic means comprising regulating means jointly responsive to the sum of the load currents of the induction motor and the second alternating-current machine and the potential of the power source and phase-shifting means connecting the regulating means to the power source.

2. In a control system for a wound rotor induction motor having stator and rotor windings, circuit means connecting the stator winding to a source of alternating-current power, a first alternating-current machine connected to the rotor winding of the induction motor, a first direct-current machine connected in driving relation with said first alternating-current machine, a second alternating-current machine connected to the power source, a second direct-current machine connected in driving relation with said second alternating-current machine, circuit means connecting said first and second direct-current machines together, means for controlling the excitation of at least one of said direct-current machines to control the speed of the induction motor, a motor-operated rheostat operable to control the excitation of said first alternating-current machine, a differential relay operable to control the operation of the motor-operated rheostat, said differential relay having opposed sets of co-acting current and potential windings, current transformer means connecting the said current windings to be responsive to the sum of the load currents of the induction motor and the second alternating-current machine, and phase-shifting means connecting the said potential windings to the power source, whereby to provide for maintaining a desired power factor of the total power flow between the power source and the induction motor and second alternating-current machine.

3. In a control system for an induction motor having primary and secondary windings and having one of its windings connected to be energized from a source of alternating-current power, a first alternating-current machine connected in circuit with the other winding, means operable to vary the excitation of said machine, a second alternating-current machine connected to the source of alternating-current power, means for transferring power between the first and second alternating-current machines, and means including differential relay means responsive to the power factor of the power flow between the source of alternating-current power and the induction motor and second alternating-current machine for controlling the means for varying the excitation of the first alternating-current machine.

4. In a control system for an induction motor having primary and secondary windings and having one of its windings connected to be energized from a source of alternating-current power, a first alternating-current machine connected in circuit with the other winding, a second alternating-current machine connected to the source of alternating-current power, power transfer means for transferring power between the first and second alternating-current machines, means for so controlling said power transfer means as to vary the speed of the induction motor, and means responsive to the power factor of the power flow between the source of alternating-current power and the induction motor and the second alternating-current machine for controlling the excitation of the first alternating-current machine, said means including a differential relay having opposed current windings connected to be energized in accordance with the sum of the load currents of the induction motor and the second alternating-current machine and opposed potential windings connected to be energized in accordance with the potential of the source of alternating-current power.

TRACY C. WETHERBY.